(12) United States Patent
Reddy et al.

(10) Patent No.: US 9,657,217 B2
(45) Date of Patent: May 23, 2017

(54) GELLABLE TREATMENT FLUIDS COMPRISING AMINO GROUP GEL-TIME MODIFIERS

(71) Applicant: Halliburton Energy Services, Inc., Houston, TX (US)

(72) Inventors: B. Raghava Reddy, The Woodlands, TX (US); Larry S. Eoff, Porter, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/742,059

(22) Filed: Jun. 17, 2015

(65) Prior Publication Data
US 2015/0284622 A1   Oct. 8, 2015

Related U.S. Application Data

(62) Division of application No. 13/171,718, filed on Jun. 29, 2011, now Pat. No. 9,090,811.

(51) Int. Cl.
| | |
|---|---|
| *C09K 8/42* | (2006.01) |
| *C09K 8/588* | (2006.01) |
| *C09K 8/035* | (2006.01) |
| *C09K 8/512* | (2006.01) |
| *C09K 8/88* | (2006.01) |

(52) U.S. Cl.
CPC .............. *C09K 8/588* (2013.01); *C09K 8/035* (2013.01); *C09K 8/512* (2013.01); *C09K 8/887* (2013.01)

(58) Field of Classification Search
CPC ...... C09K 8/512; C09K 8/887; C09K 3/1409; C09K 3/1463; C09K 8/08; C09K 8/20; C09K 8/42; C09K 8/426; C09K 8/5083; C09K 8/514; C09K 8/5756; C09K 8/5758; C09K 8/685; C09K 8/725; C09K 8/882; C09K 8/905; E21B 21/062; E21B 43/16

See application file for complete search history.

(56) References Cited

U.S. PATENT DOCUMENTS

| | | | |
|---|---|---|---|
| 6,176,315 B1 | 1/2001 | Reddy et al. | |
| 6,196,317 B1 | 3/2001 | Hardy | |
| 6,222,091 B1 * | 4/2001 | Beihoffer | A61F 13/15203 604/358 |
| 6,547,871 B2 | 4/2003 | Chatterji et al. | |
| 7,091,160 B2 | 8/2006 | Dao et al. | |
| 7,159,659 B2 | 1/2007 | Welton et al. | |
| 7,287,587 B2 | 10/2007 | Reddy et al. | |
| 7,299,874 B2 | 11/2007 | Welton et al. | |
| 7,303,019 B2 | 12/2007 | Welton et al. | |
| 7,322,414 B2 | 1/2008 | Reddy et al. | |
| 7,325,613 B2 | 2/2008 | Reddy et al. | |
| 7,331,390 B2 | 2/2008 | Eoff et al. | |
| 8,322,421 B2 | 12/2012 | Reddy et al. | |
| 8,522,874 B2 | 9/2013 | Reddy et al. | |
| 9,090,811 B2 * | 7/2015 | Reddy | C09K 8/035 |
| 9,150,781 B2 * | 10/2015 | Reddy | C09K 8/035 |
| 2006/0183646 A1 | 8/2006 | Welton et al. | |
| 2006/0234871 A1 * | 10/2006 | Dalrymple | C09K 8/428 507/211 |
| 2006/0278390 A1 | 12/2006 | Reddy et al. | |
| 2009/0145607 A1 | 6/2009 | Li | |
| 2011/0214866 A1 * | 9/2011 | Reddy | C09K 8/5083 166/294 |
| 2013/0000911 A1 | 1/2013 | Reddy et al. | |

FOREIGN PATENT DOCUMENTS

| | | |
|---|---|---|
| RU | 2411278 C1 | 2/2011 |
| WO | WO2009/026021  * | 2/2009 |

OTHER PUBLICATIONS

Office Action for RU2015117585 dated Feb. 25, 2016.

* cited by examiner

*Primary Examiner* — Kumar B Bhushan
(74) *Attorney, Agent, or Firm* — McDermott Will & Emery LLP

(57) ABSTRACT

Gellable treatment fluids comprising: an aqueous base fluid; a base polymer comprising an acrylamide monomer unit; an organic crosslinking agent comprising a crosslinkable polymer; and a gel-time modifier. The organic crosslinking agent comprising a crosslinkable selected from the group consisting of polyethyleneimine, polyvinylamine, any derivative thereof, any salt thereof, and any combination thereof. The gel-time modifier comprising at least one amino group, any salt thereof, any derivative thereof, or any combination thereof.

11 Claims, 5 Drawing Sheets

GELLABLE TREATMENT FLUIDS COMPRISING AMINO GROUP GEL-TIME MODIFIERS

CROSS-REFERENCE TO RELATED APPLICATIONS

The present application is a divisional of U.S. patent application Ser. No. 13/171,718, filed on Jun. 29, 2011.

BACKGROUND

The present invention relates to methods and compositions for reducing the amount of water produced from a subterranean formation, and, more specifically, to methods and compositions for treating at least a portion of a subterranean formation to reduce water permeability using a gellable treatment fluid that comprises a gel-time modifier comprising at least one amino group.

Water often undesirably accompanies the production of oil and gas from a well penetrating a subterranean formation. The unwanted production of water from hydrocarbon-producing wells can constitute a considerable technical problem and expense in oilfield operations. If the ratio of produced-water to produced-oil and gas becomes sufficiently large, the cost of separating the water and disposing of it can become a barrier to continued production. This can lead to abandonment of a well penetrating a subterranean formation, even when significant amounts of hydrocarbons remain therein.

In a subterranean formation, water's high mobility often allows it to flow to or from a well bore by way of natural and manmade fractures, high permeability zones, and the like. In such cases, less permeable zones in the formation can be bypassed. The bypassing of less permeable zones can be especially problematic when an aqueous treatment fluid is introduced into a subterranean formation. For example, in enhanced oil recovery techniques, an aqueous fluid can be introduced into a subterranean formation during water flooding operations. When less permeable zones are present in the subterranean formation, lower oil and gas production can occur due to a less effective water flooding operation being realized. The presence of natural and manmade fractures, high permeability zones and the like also poses problems when aqueous fluids need to be introduced into low permeability zones for purposes other than flooding operations. Examples can include acid stimulation treatments and near-wellbore cleanup fluids. In such cases, aqueous fluids can preferentially enter high permeability zones and bypass low permeability zones, which are the intended targets of fluid treatments.

One way in which the foregoing problems can be addressed is through conformance control treatments, whereby high permeability zones become fully or partially blocked to fluid flow. In the case of unwanted water production, full blockage of water producing permeable zones, regardless of high or low permeability, can stop the unwanted production of water. In the case of flooding operations, partial blocking of high permeability zones can enable oil production from bypassed low permeability zones. In the case of stimulation and near wellbore cleanup, partial blocking of high permeability zones can allow diversion of a stimulation fluid (e.g., an acid) or well cleanup fluid to a low permeability zone.

Conformance control treatments can involve introducing gellable polymer systems into a subterranean formation via an aqueous treatment fluid. The gellable polymer systems can form a gel through crosslinking a water-soluble polymer using a crosslinking agent. The gel-time and the gel strength of the gellable polymer systems are among the factors that can determine the effectiveness of a conformance control treatment. For example, if the gel-time is too short, introduction or placement of the gellable polymer system into a subterranean formation can prove problematic. Conversely, if the gel-time is too long, the gellable polymer system may not form a gel in the desired portion of the subterranean formation, or long waiting periods may be required before further operations can be carried out.

A number of crosslinking agents can be used to crosslink water-soluble polymers in gellable polymer systems. Chromium and other transition metal ions can be used to crosslink acrylamide-containing polymers and copolymers. Generally, gels formed using such crosslinking agents have proven unsuitable at higher temperatures (e.g., above about 80° C.) due to uncontrolled crosslinking rates (e.g., short gel-times), crosslinking agent precipitation, polymer degradation, and the like. In addition, chromium and certain other transition metal ions can have an undesirable environmental impact. Acrylamide-containing polymers, copolymers, and partially hydrolyzed variants thereof can also be gelled with polyalkyleneimines and polyalkylenepolyamines. In such gellable polymer systems, the gel-times are often so short that the crosslinking agent and water-soluble polymer are generally pumped downhole separately in order to prevent premature gellation from occurring. Gel-time accelerators and gel-time retarders have also been used in the art to modify the gel-times in such systems.

Gellable polymer systems typically comprise a crosslinkable polymer and a crosslinking agent. Normally, as the concentration of either of these components decreases in a treatment fluid, the time required to form a gel as measured by an increase in viscosity of the treatment fluid at a given temperature, referred to herein as "gel-time," increases. Typically, the gel-time is determined by measuring the viscosity of a treatment fluid comprising the gellable polymer system as a function of time. Although treatment fluids having lower concentration gellable polymer systems are desirable from a cost-of-goods standpoint, increased gel-times at lower concentrations can make such treatment fluids ineffective for treating a subterranean formation.

The gel-time of a treatment fluid comprising a gellable polymer system is usually a function of temperature and the concentrations of water-soluble polymer and crosslinking agent therein. Generally, at higher concentrations of these components, shorter gel-times can result. Conversely, at lower concentrations, gel-times can be increased. In some instances, low concentration gellable polymer systems can have gel-times that are increased to such an extent that they become ineffective for treating a subterranean formation. Furthermore, at lower concentrations, the gel strength can also be impacted to some degree. Although gel strength is not typically a concern in most conformance control treatment fluids due to relatively high concentrations of water-soluble polymer and crosslinking agent being used, it bears mentioning that gel strength can be reduced in low concentration gellable polymer systems.

In conformance control treatments using acrylamide-containing polymers and copolymers and crosslinking agents such as, for example, polyethyleneimine and polyalkylenepolyamines, relatively high concentrations of both components are typically used. From an economic standpoint alone, it would be desirable to reduce the amounts of either of these materials while still maintaining acceptable gel-times and gel-strengths to achieve successful conformance control. For polyethyleneimine, in particular, it would also be desirable to reduce the amounts of this highly corrosive material being used in conformance control treatment fluids in order to improve their environmental rating.

SUMMARY OF THE INVENTION

The present invention relates to methods and compositions for reducing the amount of water produced from a subterranean formation, and, more specifically, to methods and compositions for treating at least a portion of a subterranean formation to reduce water permeability using a gellable treatment fluid that comprises a gel-time modifier comprising at least one amino group.

In one embodiment, the present invention provides a method comprising: providing a gellable treatment fluid that comprises: an aqueous base fluid; a base polymer comprising an acrylamide monomer unit; an organic crosslinking agent; and a gel-time modifier comprising at least one amino group, any salt thereof, any derivative thereof, or any combination thereof; introducing the gellable treatment fluid into at least a portion of a subterranean formation; and allowing the gellable treatment fluid to form a gel in the subterranean formation.

In one embodiment, the present invention provides a method comprising: providing a gellable treatment fluid that comprises: an aqueous base fluid; a base polymer comprising an acrylamide monomer unit; an organic crosslinking agent comprising a crosslinkable polymer selected from the group consisting of polyethyleneimine, polyvinylamine, any derivative thereof, any salt thereof, and any combination thereof; and a gel-time modifier comprising at least one compound selected from the group consisting of amino alcohols, oligomeric polyamines, any salt thereof, any derivative thereof, and any combination thereof; and wherein the gellable treatment fluid has a reduced gel-time relative to a like gellable treatment fluid lacking the gel-time modifier; introducing the gellable treatment fluid into at least a portion of a subterranean formation; and allowing the gellable treatment fluid to form a gel in the subterranean formation.

In one embodiment, the present invention provides a gellable treatment fluid comprising: an aqueous base fluid; a base polymer comprising an acrylamide monomer unit; an organic crosslinking agent comprising a crosslinkable polymer selected from the group consisting of polyethyleneimine, polyvinylamine, any derivative thereof, any salt thereof, and any combination thereof; and a gel-time modifier comprising at least one amino group, any salt thereof, any derivative thereof, or any combination thereof.

The features and advantages of the present invention will be readily apparent to one of ordinary skill in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will be evident to one having ordinary skill in the art and the benefit of this disclosure.

DETAILED DESCRIPTION

Figure 1:
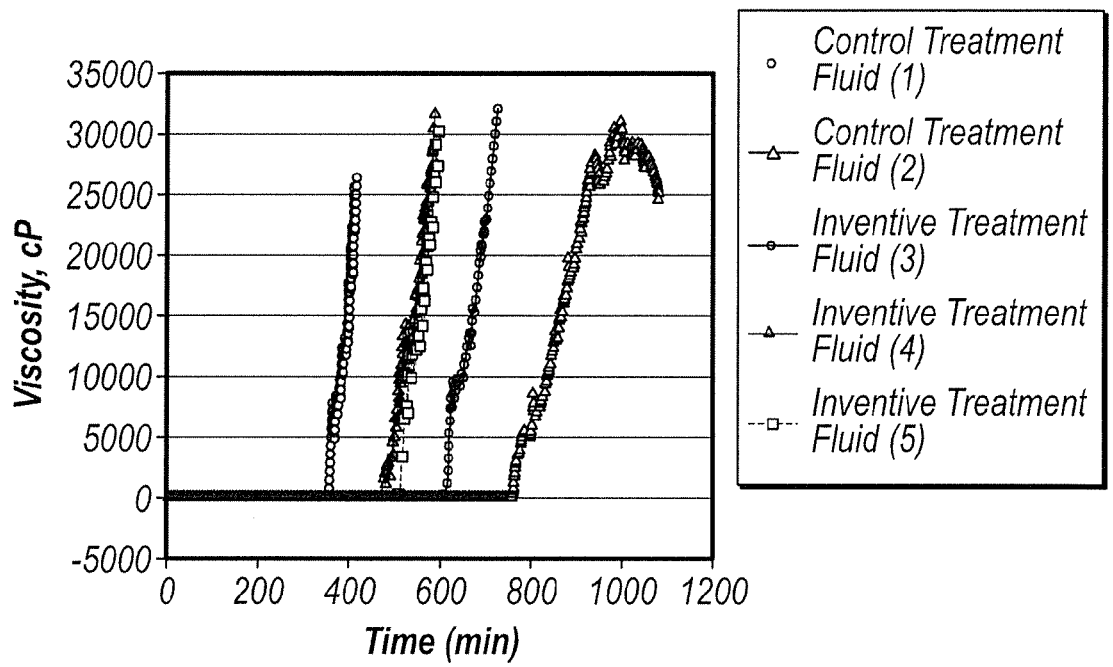
FIG. 1 shows an illustrative plot of viscosity as a function of time at 160° F. for various gellable treatment fluids comprising a t-butylacrylate/acrylamide base polymer, polyethyleneimine, and, optionally, an amino alcohol gel-time modifier.

The present invention relates to methods and compositions for reducing the amount of water produced from a subterranean formation, and, more specifically, to methods and compositions for treating at least a portion of a subterranean formation to reduce water permeability using a gellable treatment fluid that comprises a gel-time modifier comprising at least one amino group.

There are many advantages of the present invention. For instance, the present invention provides treatment fluid compositions and methods for use thereof in which gellable polymer systems are present in lower concentrations than are conventionally used in the art, while still providing gel-times that are of an effective length for suitable downhole placement and performance to be realized. As defined herein, a "treatment fluid" is a fluid that is placed in a subterranean formation in order to perform a desired function. Treatment fluids can be used in a variety of subterranean operations, including, but not limited to, drilling operations, production treatments, stimulation treatments, remedial treatments, fluid diversion operations, fracturing operations, secondary or tertiary EOR operations, and the like. As used herein, the terms "treatment" and "treating" refer to any subterranean operation that uses a fluid in conjunction with performing a desired function and/or achieving a desired purpose. The terms "treatment" and "treating," as used herein, do not imply any particular action by the fluid or any particular component thereof unless otherwise specified. Treatment fluids can include, for example, drilling fluids, fracturing fluids, acidizing fluids, conformance treatment fluids, damage control fluids, remediation fluids, scale removal and inhibition fluids, chemical floods, and the like.

According to the present embodiments, it has been surprisingly discovered that inclusion of the present gel-time modifiers can reduce the gel-time in a treatment fluid comprising a gellable polymer system. In the case of a low concentration gellable polymer system, the additives can reduce the gel-time to a level that is more amenable for treating a subterranean formation. That is, the additives can serve as gel-time promoters in such embodiments. However, in some alternative embodiments, the additives can increase the gel-time at higher additive concentrations. That is, the additives can serve as gel-time retarders in these embodiments. In such embodiments, the additives can increase the gel-time of a treatment fluid whose gel-time is otherwise too short to be useful for a desired application. Hence, the present additives can be added to a treatment fluid comprising a gellable polymer system in sufficient amounts to increase or to decrease the gel-time to a desired extent.

More specifically, it has been surprisingly discovered that treatment fluids comprising a base polymer comprising an acrylamide monomer unit (e.g., polyacrylamide, acrylamide copolymers, and partially hydrolyzed versions thereof) and an organic crosslinking agent (e.g., polyethyleneimine and polyalkyleneamines), can have reduced gel-times when small amounts of a gel-time modifier that comprises at least one amino group are included in the treatment fluid. Illustrative compounds comprising at least one amino group that can modify the gel-times according to the present embodiments include, for example, amino alcohols and oligomeric polyamines (e.g., diethylenetriamine, triethylenetetraamine, and tetraethylenepentaamine). Although polyamine compounds having much higher molecular weights (e.g., polyethyleneimine and polyalkyleneamines), can induce crosslinking of acrylamide polymers, it has been found in control experiments that amino alcohols and small molecule oligomeric polyamines do not appear to effectively crosslink (or even initiate measurable crosslinking) with acrylamide polymers alone. Hence, the fact that amino alcohols and oligomeric polyamines can facilitate crosslinking is particularly surprising. Further, the fact that the amino alcohols and oligomeric polyamines become gel-time retarders at higher concentration is also surprising, since it would ordinarily be expected that gel-time promotion would continually increase with increasing concentration.

Other additives can also be used in combination with the gel-time modifiers comprising at least one amino group, as discussed hereinafter, to further modify the gel-times. For example, in one embodiment, quaternary ammonium salts can be used to further modify the gel-times.

Concerns have recently been raised regarding the environmental impact of treatment fluids used for various subterranean operations. Since the treatment fluids of the present invention can comprise a lower concentration of at least one of the components of the gellable polymer system than do conventional treatment fluids having comparable gel-times, the present treatment fluids can be particularly advantageous from an environmental standpoint. Particularly, in some embodiments, the present treatment fluids can comprise a lower concentration of crosslinking agent and/or base polymer than would otherwise be required to achieve a given gel-time. In more specific embodiments, use of a gel-time modifier comprising at least one amino group in the present treatment fluids can allow lower concentrations of polyethyleneimine, which is highly corrosive, to be used in the treatment fluid.

In some applications, depending on the subterranean formation, inorganic salts (e.g., alkali metal salts or alkaline earth metal salts), such as sodium chloride or potassium chloride can be included in treatment fluid. Generally, an increase in salt concentration can increase the gel-time. The increase in gel-time can be particularly problematic at low temperatures, where gel-times are inherently longer because of slower chemical reaction rates at low temperatures. Increased gel times in treatment fluids comprising a salt can be advantageously compensated for, in some embodiments, by using gel-time accelerators. At high temperatures, gel-times are shorter. By selecting an appropriate concentration of a gel-time modifier, use of the treatment fluids at higher temperatures can become possible. Specifically, in some embodiments, the gel-time modifiers can increase the gel-time such that an appropriate gellation rate can be realized under high temperatures.

Although the present disclosure primarily describes treatment fluids that can be used in conformance control operations, it is to be understood that the treatment fluids of the present invention can be used in any of the drilling stage, the production stage, the stimulation stage, enhanced oil recovery (EOR) operations, or the remediation stage of a subterranean operation. Any of these operations can benefit from the reduced amount of water produced from the subterranean formation or from decreased formation water permeability, for example.

Treatment fluids of the present invention generally comprise an aqueous base fluid as the continuous phase. Aqueous phase base fluids can include, for example, fresh water, acidified water, salt water, seawater, brine, or an aqueous salt solution. In some embodiments, the treatment fluids can also comprise small amounts of hydrocarbons such that the aqueous base fluid remains as the continuous phase. The small amounts of hydrocarbons can be introduced from any source. In one embodiment, introduction of small amounts of hydrocarbons in the present treatment fluids can take place concurrently with the components of the gellable polymer system, as some of these components may be obtained commercially in a hydrocarbon base fluid. It is not believed that small amounts of hydrocarbons, when present, significantly impact the treatment fluid's performance in forming a gel.

In various embodiments, treatment fluids of the present invention can include an aqueous base fluid as the continuous phase. In some embodiments, the aqueous base fluid can be an aqueous salt solution. Such aqueous salt solutions can have a salt concentration ranging between about 0.1% and about 10% by weight. The salt concentration can range between about 1% and about 10% by weight in some embodiments or between about 2% and about 5% by weight in other embodiments. In certain embodiments, some or all of the salt can be replaced by another material. For example, in some of the present embodiments, the gel-time modifier comprising at least one amino group can replace at least a portion of the salt in the aqueous base fluid. That is, such treatment fluids can have a lower salt concentration than a like treatment fluid lacking the gel-time modifier. In other embodiments, the gel-time modifier can be used in a base fluid that is comparable in composition to a like treatment fluid lacking the gel-time modifier. That is, in such embodiments, the gel-time modifier does not replace the salt of the base fluid. The salt of the aqueous salt solution is generally an alkali metal or alkaline earth metal salt. Of these, sodium chloride and potassium chloride are presently preferred. Other alkali metal or alkaline earth metal salts such as, for example, nitrates, acetates, and soluble formates can also be used for forming the aqueous salt solution.

In some embodiments, gellable treatment fluids of the present invention can comprise an aqueous base fluid, a base polymer that comprises an acrylamide monomer unit, an organic crosslinking agent, and a gel-time modifier that comprises at least one amino group.

In some embodiments, the gellable treatment fluids can have a reduced gel-time relative to that of a like treatment fluid lacking the gel-time modifier. In alternative embodiments, the gellable treatment fluids can have an increased gel-time relative to that of a like treatment fluid lacking the gel-time modifier. Increased gel-times are typically observed at higher concentration of the gel-time modifier. As used herein, the term "like treatment fluid" refers to a second treatment fluid having substantially the same composition as that of a first treatment fluid, with the exceptions of: 1) the second treatment fluid having a different concentration of at least one component, and 2) the second treatment fluid lacking the gel-time modifier comprising a quaternary ammonium salt. Inert components that do not substantially affect the gel-time can also be present in a "like treatment fluid."

In some embodiments, the base polymers can be water soluble. In some embodiments, the base polymers of the present treatment fluids can comprise an acrylamide monomer unit. Such base polymers can include, for example, polyacrylamide, acrylamide copolymers, and partially hydrolyzed versions thereof. In alternative embodiments, base polymers that comprise a methacrylamide monomer unit can be used. Examples of suitable (meth)acrylamide base polymers are described in U.S. Pat. No. 6,176,315 which is incorporated herein by reference in its entirety. Such base polymers can include, for example, water soluble polymethacrylamide, methacrylamide copolymers, and partially hydrolyzed variants thereof. Optionally, acrylamide and methacrylamide monomers can be used in combination with one another. In some embodiments, the base polymer can be a partially hydrolyzed polyacrylamide. Such a base polymer is available from Halliburton Energy Services of Duncan, Okla. under the tradename "FDP-835™," which has a molecular weight of about 640,000. In some embodiments, the base polymer can be a copolymer of acrylamide and an acrylate. In more specific embodiments, the base polymer can be a copolymer of acrylamide and t-butyl acrylate. Such a base polymer is available from Halliburton Energy Services of Duncan, Okla. under the tradename "HZ-10™," which has a molecular weight of about 107,000. In still other embodiments, the base polymer can be a copolymer of acrylamide and/or methacrylamide and monomers such as, for example, ethylene, propylene, styrene, maleic anhydride, and the like. Such polymers can also be partially hydrolyzed. In still other alternative embodiments, an acrylate ester monomer unit can replace acrylamide or methacrylamide or be used in combination with acrylamide or methacrylamide.

A portion of a base polymer comprising an acrylamide monomer unit is shown in Formula (1) below, where the wavy lines represent bonding to other monomer units.

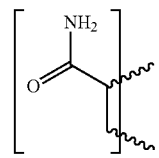

Formula (1)

In some embodiments, the base polymer can comprise an acrylate ester monomer unit. A portion of a base polymer comprising an acrylate ester monomer unit is shown in Formula (2) below, where the wavy lines represent bonding to other monomer units and R is an alkyl or aryl group, for example.

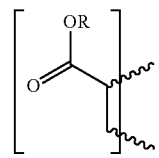

Formula (2)

In some embodiments, base polymers comprising acrylamide or acrylate ester monomer units can be at least partially hydrolyzed. As used herein, the term "at least partially hydrolyzed" refers to base polymers that have at least a portion of their side chain amide or ester groups hydrolyzed to form side chain acid groups. That is, base polymers that are partially hydrolyzed have at least some acrylic acid monomer units. In various embodiments, the degree of hydrolysis can range from about 0.1% to about 30% of the acrylamide/acrylate monomer units. A partial structure of a base polymer comprising acrylic acid monomer units is shown in Formula (3) below, where the wavy lines represent bonding to other monomer units (e.g., other acrylic acid monomer units and/or other acrylamide or acrylate ester monomer units).

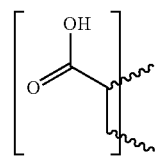

Formula (3)

Depending on the pH of the treatment fluid, base polymers that are at least partially hydrolyzed can have their acidic side chains protonated (i.e., acidic) or deprotonated (i.e., anionic form). In various embodiments, the base polymers of the present invention can have a molecular weight ranging between about 100,000 and about 20,000,000.

Among other factors, the performance of the preceding base polymers can be impacted by the temperature at which they are allowed to gel. That is, the gel-times of the base polymers can vary depending on the temperature of the subterranean formation to which they are introduced. For example, a base polymer that produces an acceptable gel-time at lower temperatures can gel at an unacceptably fast rate at higher temperatures. Conversely, a base polymer that gels at an acceptable rate at higher temperature may not gel at an acceptable rate, if at all, at lower temperatures. For conformance control treatments using the specific base polymers set forth above in combination with polyethyleneimine as an organic crosslinking agent, an acrylamide/t-butyl acrylate copolymer is typically used when the temperature of the subterranean formation is about 160° F. or higher, whereas a partially hydrolyzed polyacrylamide is typically used when the subterranean formation has a temperature ranging between about 60° F. and about 160° F. It is to be noted that these preferred operating temperature ranges are for gellable treatment fluids that lack a gel-time modifier comprising at least one amino group or any other gel-time modifier. Use of a gel-time modifier as in the present embodiments can allow an expanded effective operating temperature range of the base polymer. Accordingly, the present treatment fluids can be effectively used at temperatures lower than those conventionally used in the art, particularly those treatment fluids that comprise an acrylamide/t-butyl acrylate copolymer.

In some embodiments, the base polymers of the present invention are not hydrophobically modified. As used herein, the term "not hydrophobically modified" refers to a base polymer that does not comprise a hydrophobic modification thereon. As used herein, a hydrophobic modification of a base polymer will be considered to be any hydrophobic group having more than about 4 carbon atoms. More particularly, in some embodiments, the base polymers of the present invention lack monomer units having a quaternized nitrogen atom and a hydrophobic modification thereon.

Particularly suitable organic crosslinking agents that can be used with the above base polymers are themselves crosslinkable polymers. In some embodiments, suitable crosslinkable polymers include, for example, polyalkyleneimines and polyalkylenepolyamines, any derivative thereof, any salt thereof, and any combination thereof. In more specific embodiments, suitable crosslinkable polymers include, for example, polyethyleneimine, polyvinylamine (polyethylenepolyamine), any derivative thereof, any salt thereof, and any combination thereof. In alternative embodiments, suitable crosslinkable polymers can include polypropyleneimine, polypropylenepolyamine, polyallylamine, any derivative thereof, any salt thereof, and any combination thereof. In yet other alternative embodiments, the organic crosslinking agent can be chitosan, polymyxins, polylysine, any derivative thereof, any salt thereof, and any combination thereof.

In some embodiments, suitable gel-time modifiers that comprise at least one amino group can be amino alcohols, oligomeric polyamines, any salt thereof, any derivative thereof, or any combination thereof. In general, it is contemplated that any amine compound that has at least some miscibility with water can be suitable for use in the present embodiments. It is also contemplated that any derivative of amino alcohols or oligomeric polyamines comprising derivatized amino nitrogen atoms can undergo reactions under downhole conditions to release the amino groups in underivatized form. That is, precursors to such amino alcohols and oligomeric polyamines are also contemplated by the present embodiments. For example, it is contemplated that amine compounds comprising an acylated amino group can undergo hydrolysis under downhole conditions to release free amino groups, which then function as gel-time modifiers.

Illustrative amino alcohol gel-time modifiers can include, for example, ethanolamine, diethanolamine, triethanolamine, propanolamine, triisopropanolamine, any salt thereof, any derivative thereof, any combination thereof, and the like. When present in a salt form, the free amino alcohol can be regenerated either by pH adjustment prior to pumping downhole in some embodiments or under suitable downhole conditions in other embodiments.

Oligomeric polyamines suitable for use in the present embodiments generally have a molecular weight of less than about 400. That is, the oligomeric polyamines suitable for use in the present embodiments are non-polymeric amine compounds. Illustrative examples of suitable oligomeric polyamines can include, for example, diethylenetriamine, triethylenetetraamine, tetraethylenepentaamine, any salt thereof, any derivative thereof, any combination thereof, and the like. When present in a salt form, the free oligomeric polyamine can be regenerated either by pH adjustment prior to pumping downhole in some embodiments or under suitable downhole conditions in some embodiments. In alternative embodiments, non-oligomeric amines such as, for example, propylamine, butylamine, diethylamine, diisopropylamine, ethyldiisopropylamine, trimethylamine, triethylamine, pyridine, and the like can be used.

In general, the gel-times of the present treatment fluids are a function of the amount of gel-time modifier used. Generally, higher concentrations of the gel-time modifier comprising at least one amino group can lead to shorter gel-times. However, above a threshold concentration of the gel-time modifier, longer gel-times can result. Hence, according to some embodiments of the present invention, a gel-time modifier comprising at least one amino group can be added to a treatment fluid comprising a gellable polymer system of a given composition in order to increase or decrease the gel-time.

Without being limited by theory, it is believed that the mechanism by which an amine-containing gel-time modifier functions as a gel-time accelerator or a gel-time retarder can be explained as follows. Crosslinking agents such as, for example, polyethyleneimine and polyalkylene polyamines can exist in partially protonated forms in aqueous fluids. The degree of protonation can depend on the pH of the fluid, the type of amino group (e.g., primary, secondary or tertiary, aliphatic or aryl amino groups) and the polymer structure. It is believed that a crosslinking agent comprising protonated amino groups does not function as a crosslinking center due to the unavailability of the lone pair electrons on the nitrogen atom. It is further believed that amine-containing gel-time modifiers can deprotonate protonated amino nitrogen atoms in the crosslinking agent, thus making them available for crosslinking reactions and reducing the gel-time. At higher concentrations of gel-time modifier, it is believed that there can be an excess of amino groups from the gel-time modifier, even after deprotonating the amino nitrogen atoms in crosslinking agent. It is believed that the excess amino groups can react with water to generate hydroxide ions according to Equation (1), where R is an alkyl or aryl group.

$$R\text{---}NH_2 + H_2O \rightarrow R\text{---}NH_3^+ + OH^- \tag{1}$$

It is believed that the generated hydroxide ion can hydrolyze amide functional groups in the crosslinking agent to generate carboxylate ions according to Equation (2).

$$OH^- + R\text{---}C(O)NH_2 \rightarrow R\text{---}C(O)O^- + NH_3 \tag{2}$$

It is generally the case that increased hydrolysis levels in polyacrylamide polymers can increase gel-times of a treatment fluid formed therefrom.

Generally, the base polymer, the organic crosslinking agent, and the gel-time modifier are used together in concentrations that are appropriate to achieve a desired gel-time for a given application. Given the benefit of the present disclosure, one of ordinary skill in the art will be able to determine appropriate concentrations of the base polymer, the organic crosslinking agent, and the gel-time modifier through routine experimentation. In some embodiments, the gellable treatment fluids of the present invention can have reduced gel-times relative to a like gellable treatment fluid that lacks the gel-time modifier.

In some embodiments, the concentration of the gel-time modifier can be less than about 5% by weight. In other embodiments, the concentration of the gel-time modifier can be less than about 2% by weight. In still other embodiments, the concentration of the gel-time modifier can be less than about 1% by weight. In some embodiments, the concentration of the gel-time modifier can range between about 0.1% and about 1% by weight. In some embodiments, the concentration of the gel-time modifier can range between about 0.2% and about 0.8% by weight. In still other embodiments, the concentration of the gel-time modifier can range between about 1% and about 2% by weight.

Generally, the concentration of the base polymer can be about 10% or less by weight in a treatment fluid lacking the gel-time modifier comprising at least one amino group. Likewise, the concentration of the organic crosslinking agent can be typically about 5% or less by weight in a treatment fluid lacking the gel-time modifier comprising at least one amino group. In treatment fluids of the present invention, the concentrations of the base polymer and the organic crosslinking agent can generally be at the foregoing values or lower. In some embodiments, inclusion of a gel-time modifier comprising at least one amino group can allow the concentration of at least one of the base polymer or the organic crosslinking agent to be reduced by at least about 20% relative to a like treatment fluid lacking the gel-time modifier, while maintaining a gel-time that is suitable for use in a subterranean formation. In other embodiments inclusion of the gel-time modifier comprising at least one amino group can allow the concentration of at least one of the base polymer or the organic crosslinking agent to be reduced by at least about 40% relative to a like treatment fluid lacking the gel-time modifier. In still other embodiments inclusion of the gel-time modifier comprising at least one amino group can allow the concentration of at least one of the base polymer or the organic crosslinking agent to be reduced by at least about 60% relative to a like treatment fluid lacking the gel-time modifier. In some embodiments, at lower concentrations of the base polymer and/or the organic crosslinking agent, the gel-time can be substantially the same as that of a like treatment fluid of higher concentration lacking the gel-time modifier. In other embodiments, the gel-time can be intermediate between that of a like treatment fluid of higher concentration lacking the gel-time modifier and a like treatment fluid of lower concentration lacking the gel-time modifier. Thus, it is not a necessary condition that the treatment fluids of the present invention have a gel-time that is substantially the same as that of higher concentration treatment fluid. According to the present embodiments, the present treatment fluids have a gel-time that is altered from that of a like treatment fluid lacking the gel-time modifier. Modification of the gel-time can make the treatment fluids of the present invention suitable for use in a given subterranean application.

In some embodiments, the base polymer and the organic crosslinking agent can be present at a ratio of up to about 50:1 base polymer:organic crosslinking agent. In other embodiments, the ratio of base polymer:organic crosslinking agent can be at most about 20:1. In still other embodiments, the ratio of base polymer:organic crosslinking agent can be at most about 10:1. In some embodiments, the ratio of base polymer:organic crosslinking agent can be at least about 5:1.

As will be evident to one having ordinary skill in the art, when the amount of base polymer is reduced in the present treatment fluids with the amount of organic crosslinking agent remaining the same as a like treatment fluid lacking the gel-time modifier, the ratio of these two components will be lower than that of a like treatment fluid of higher concentration lacking the gel-time modifier. Likewise, when the amount of organic crosslinking agent is reduced in the present treatment fluids with the amount of base polymer remaining the same as in a like treatment fluid lacking the gel-time modifier, the ratio of the two components will be higher. When the amount of both the base polymer and the organic crosslinking agent are lowered, the ratio of these two components can be lower, higher or the same, depending upon how much the quantity of each component is lowered relative to the other.

In some embodiments, the present treatment fluids can further comprise at least one additional gel-time modifier in supplement to the gel-time modifier comprising at least one amino group. Such additional gel-time modifiers can be gel-time accelerators in some embodiments or gel-time retarders in other embodiments, depending on whether one wants to increase or decrease the gel-time in a particular treatment fluid. Illustrative gel-time modifiers can include, for example, pH modifying agents such as, for example, inorganic acids, organic acids, organic salts, and inorganic salts. Examples of such gel-time modifiers are set forth in U.S. Pat. Nos. 7,331,390, 7,325,613, 7,322,414, and 7,287,587, and co-pending U.S. patent application Ser. Nos. 12/716,951, 12/716,979 and 12/717,004, all filed on Mar. 3, 2010. Specific illustrative examples of pH modifying agents can include, for example, alkali metal carbonates, bicarbonates, acetates, formates, and hydroxides; organic acids (e.g., phenols or acetic acid); mineral acids (e.g., hydrochloric acid); and Lewis acids (e.g., boric acid). Illustrative gel-time retarders that can be used in the present embodiments include, for example, transition metal salts that can coordinate the organic crosslinking agent and acid anhydrides that can at least partially acylate amino groups in the organic crosslinking agent. A suitable coordinated organic crosslinking agent is described in commonly owned U.S. Pat. No. 6,196,317, which is incorporated herein by reference in its entirety. The use of acid anhydrides as a gel-time retarder is described in commonly owned U.S. Pat. No. 7,091,160, which is incorporated herein by reference in its entirety. When a gel-time retarder is used, the coordination bond strength or the degree of acylation can help control the gel-time.

In some embodiments, the at least one additional gel-time modifier can be compounds other than those described above that have been conventionally used in the art. For example, in some embodiments, the at least one additional gel-time modifier can be a quaternary ammonium salt. Use of the quaternary ammonium salts as gel-time modifiers is described in commonly owned U.S. patent application Ser. No. 13/171,677, filed on Jun. 29, 2011 concurrently herewith and now available as U.S. Patent Application Publication 2013/0000911, which is incorporated herein by reference in its entirety. In some embodiments, use of a quaternary ammonium salt in combination with a gel-time modifier comprising at least one amino group can result in further decreases in gel-time of a gellable polymer system.

Suitable quaternary ammonium salts that can be used in the present treatment fluids are typically tetraalkylammonium salts. Illustrative tetraalkylammonium salts can include, without limitation, tetramethylammonium halides, tetraethylammonium halides, tetrapropylammonium halides, tetrabutylammonium halides, and the like. The alkyl groups in the quaternary ammonium salts can be either straight chain or branched. In some embodiments, the treatment fluids of the present invention can comprise tetramethylammonium chloride as the quaternary ammonium salt. Longer chain (e.g., >$C_4$) quaternary ammonium salts can be cationic surfactants. However, without being bound by theory or mechanism of action, it is believed that the quaternary ammonium salts are not functioning in a surfactant role in the present embodiments. Although it is believed that quaternary ammonium salts having any carbon chain length can be used in the present embodiments, it is preferred that the quaternary ammonium salts comprise alkyl groups in which none of the alkyl groups are larger than $C_4$ alkyl groups. In alternative embodiments, however, quaternary ammonium salts that have at least one alkyl group that is larger than a $C_4$ alkyl group can also be used. It is to be noted that it is particularly surprising that quaternary ammonium salts can serve to reduce the gel-times in the present treatment fluids, since inorganic ammonium salts have been found in the art to increase gel-times in like treatment fluids.

In some embodiments, treatment fluids of the present invention can further comprise at least one surfactant. Such surfactants include cationic surfactants, anionic surfactants, zwitterionic surfactants, and non-ionic surfactants, numerous examples of each of which are known to one having ordinary skill in the art. When present, a surfactant can be used in the present treatment fluids at a concentration ranging between about 0.1% and about 2.0% by weight or between about 0.5% and about 1.0% by weight in various embodiments.

Illustrative examples of surfactants can include, without limitation, ethoxylated nonyl phenol phosphate esters, alkyl phosphonates, linear alcohols, nonylphenol compounds, alkoxylated fatty acids, alkylphenol alkoxylates, ethoxylated amides, ethoxylated alkyl amines, betaines, methyl ester sulfonates (e.g., as described in commonly owned U.S. Pat. Nos. 7,159,659; 7,299,874; and 7,303,019 and U.S. patent application Ser. No. 11/058,611, filed Feb. 2, 2005 (now available as United States Patent Application Publication 2006/0183646), the entire disclosures of which are incorporated herein by reference), hydrolyzed keratin (e.g., as described in commonly owned U.S. Pat. No. 6,547,871, the entire disclosure of which is incorporated herein by reference), sulfosuccinates, taurates, amine oxides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), modified betaines, alkylamidobetaines (e.g., cocoamidopropyl betaine) and quaternary ammonium compounds (e.g., trimethyltallowammonium chloride, trimethylcocoammonium chloride). Suitable surfactants can be used in a liquid or powder form.

Further, the present treatment fluids can optionally comprise any number of additional additives commonly used in treatment fluids including, for example, anti-oxidants, polymer degradation prevention additives, relative permeability modifiers, scale inhibitors, corrosion inhibitors, foaming agents, defoaming agents, antifoam agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), lubricants, breakers, friction reducers, bridging agents, viscosifiers, weighting agents, solubilizers, pH control agents (e.g., buffers), hydrate inhibitors, consolidating agents, bactericides, and the like. Combinations of these additives can be used as well.

In some embodiments, the gellable treatment fluids described herein can be used for treating at least a portion of a subterranean formation. In some embodiments, such treatments can involve reducing an amount of water produced from the portion of the subterranean formation. In some embodiments, such treatments can result in partial or complete reduction in permeability of the subterranean formation to water.

In some embodiments, methods of the present invention can comprise providing a gellable treatment fluid that comprises an aqueous base fluid, a base polymer that comprises an acrylamide monomer unit, an organic crosslinking agent, and a gel-time modifier that comprises at least one amino group, any salt thereof, any derivative thereof, or any combination thereof; introducing the gellable treatment fluid into at least a portion of a subterranean formation, and allowing the gellable treatment fluid to form a gel in the subterranean formation.

In some embodiments, methods of the present invention can comprise providing a gellable treatment fluid that comprises an aqueous base fluid, a base polymer comprising an acrylamide monomer unit, an organic crosslinking agent comprising a crosslinkable polymer selected from polyethyleneimine, polyvinylamine, any derivative thereof, any salt thereof, and any combination thereof, and a gel-time modifier that comprises at least one compound selected from amino alcohols, oligomeric polyamines, any salt thereof, any derivative thereof, and any combination thereof; introducing the gellable treatment fluid into at least a portion of a subterranean formation; and allowing the gellable treatment fluid to form a gel in the subterranean formation. In such embodiments, the gellable treatment fluid can have a reduced gel-time relative to a like gellable treatment fluid lacking the gel-time modifier.

To facilitate a better understanding of the present invention, the following examples of preferred embodiments are given. In no way should the following examples be read to limit, or to define, the scope of the invention.

EXAMPLES

Example 1

Gel-Times at 160° F. in Gellable Treatment Fluids Comprising a t-Butylacrylate/Acrylamide Base Polymer, Polyethyleneimine, and an Amino Group-Containing Gel-Time Modifier (Reduction of Crosslinkable Polymer Amounts)

Control gellable treatment fluids were prepared at the following compositions: (1) 350 gal/Mgal "HZ-10" and 60 gal/Mgal "HZ-20" in 2% aqueous KCl base fluid, and (2) 350 gal/Mgal "HZ-10" and 30 gal/Mgal "HZ-20" in 2% aqueous KCl base fluid. Inventive treatment fluids were prepared at the following compositions: (3) 350 gal/Mgal "HZ-10," 30 gal/Mgal "HZ-20," and 0.36% by weight ethanolamine in 2% aqueous KCl base fluid, (4) 350 gal/Mgal "HZ-10," 30 gal/Mgal "HZ-20," and 0.75% by weight ethanolamine in 2% aqueous KCl base fluid, (5) 350 gal/Mgal "HZ-10," 30 gal/Mgal "HZ-20," and 0.8% by weight diethanolamine in 2% aqueous KCl base fluid, (6) 350 gal/Mgal "HZ-10," 30 gal/Mgal "HZ-20," and 0.36% by weight diethylene triamine in 2% aqueous KCl base fluid, (7) 350 gal/Mgal "HZ-10," 30 gal/Mgal "HZ-20," and 0.75% by weight diethylene triamine in 2% aqueous KCl base fluid, (8) 350 gal/Mgal "HZ-10," 30 gal/Mgal "HZ-20," and 1.5% by weight diethylenetriamine in 2% aqueous KCl base fluid, (9) 350 gal/Mgal "HZ-10," 30 gal/Mgal "HZ-20," and 0.36% by weight triethylenetetraamine in 2% aqueous KCl base fluid, (10) 350 gal/Mgal "HZ-10," 30 gal/Mgal "HZ-20," and 0.75% by weight triethylenetetraamine in 2% aqueous KCl base fluid, and (11) 350 gal/Mgal "HZ-10," 30 gal/Mgal "HZ-20," and 1.5% by weight triethylenetetraamine in 2% aqueous KCl base fluid. "HZ-10" is a t-butylacrylate/acrylamide copolymer that is available from Halliburton Energy Services of Duncan, Okla. "HZ-20" is a polyethyleneimine polymer that is available from Halliburton Energy Services of Duncan, Okla.

The viscosities of the above treatment fluids were measured as a function of time in order to determine their gel-times. Viscosity measurements were made at 160° F. FIG. 1 shows an illustrative plot of viscosity as a function of time at 160° F. for various gellable treatment fluids comprising a t-butylacrylate/acrylamide base polymer, polyethyleneimine, and, optionally, an amino alcohol gel-time modifier. As shown in FIG. 1, control treatment fluid (1) had a gel-time of approximately 350 minutes. When the polyethyleneimine concentration was halved in control treatment fluid (2), the gel-time increased to approximately 750 minutes. In contrast, when the 0.36 wt. % ethanolamine was included in inventive treatment fluid (3), the gel-time decreased to about 600 minutes. A further decrease in gel-time to about 500 minutes was observed in inventive treatment (4) when the ethanolamine concentration was doubled to 0.75 wt. %. A similar gel-time was observed in inventive treatment fluid (5), which comprised 0.8 wt. % diethanolamine. Although the gel-times of the inventive treatment fluids did not reach those of the original control treatment fluid (1), the gel-times were still significantly reduced compared to that seen for control treatment fluid (2). In the case of inventive treatment fluids (3)-(5), the gel-times were comparable to those obtained when about 45-50 gal/Mgal of polyethyleneimine was used in the treatment fluid without the amino alcohol gel-time modifier being present.

Figure 2:
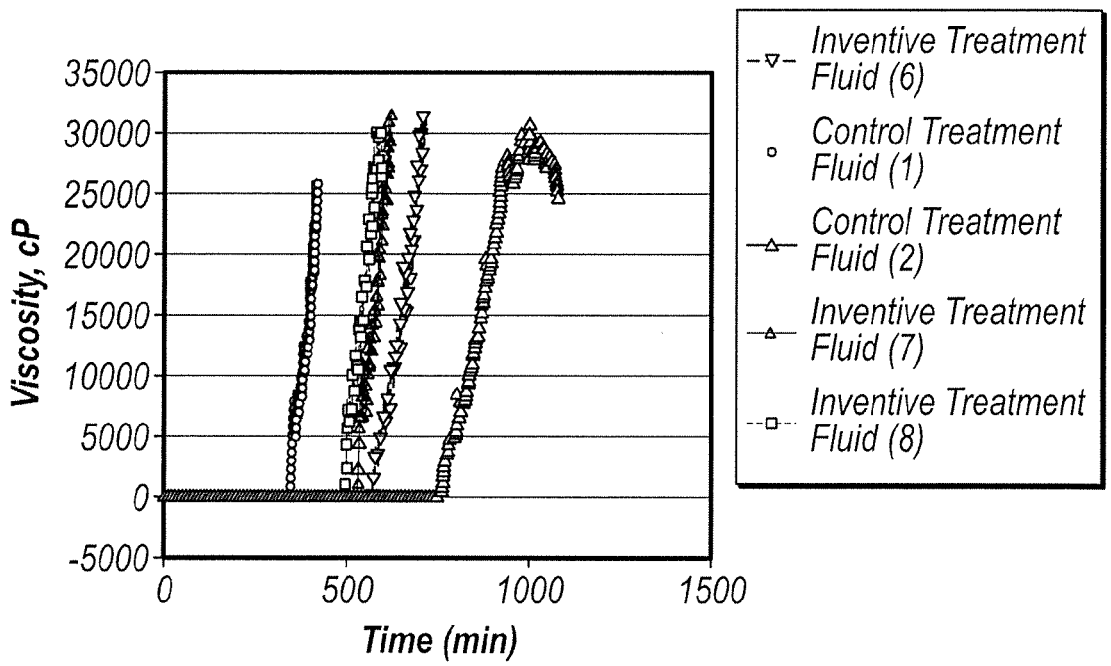
FIG. 2 shows an illustrative plot of viscosity as a function of time at 160° F. for various gellable treatment fluids comprising a t-butylacrylate/acrylamide base polymer, polyethyleneimine, and, optionally, a diethylenetriamine gel-time modifier.
Figure 3:
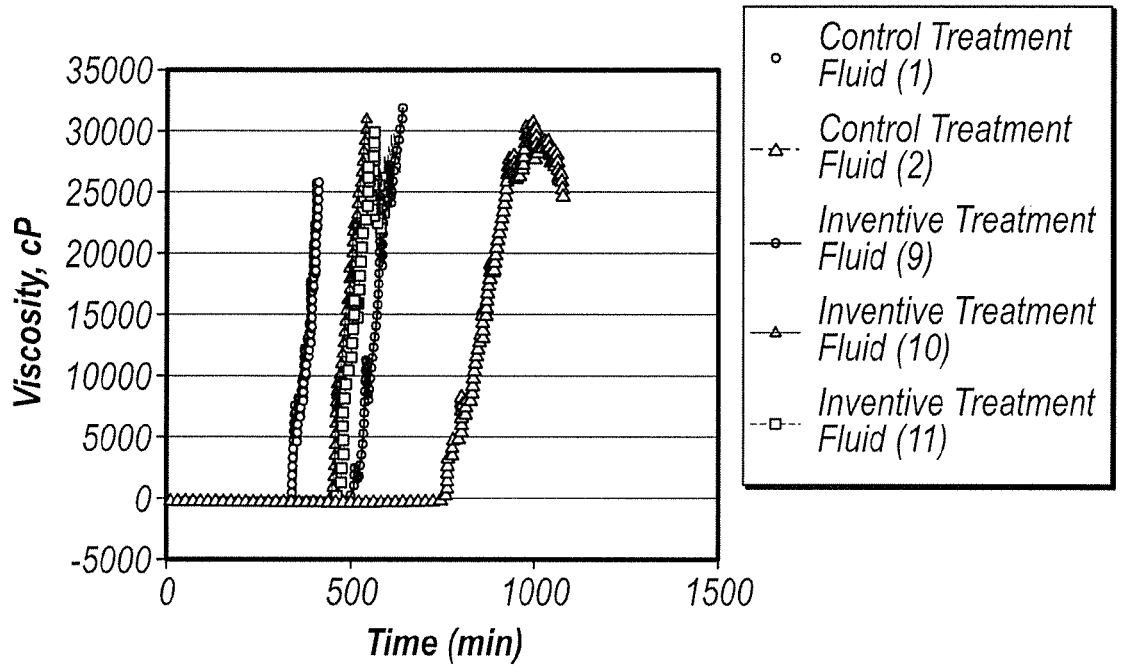
FIG. 3 shows an illustrative plot of viscosity as a function of time at 160° F. for various gellable treatment fluids comprising a t-butylacrylate/acrylamide base polymer, polyethyleneimine, and, optionally, a triethylenetetraamine gel-time modifier.

Similar results were observed when the amino alcohol gel-time modifier was replaced with an oligomeric polyamine gel-time modifier. FIG. 2 shows an illustrative plot of viscosity as a function of time at 160° F. for various gellable treatment fluids comprising a t-butylacrylate/acrylamide base polymer, polyethyleneimine, and, optionally, a diethylenetriamine gel-time modifier. FIG. 3 shows an illustrative plot of viscosity as a function of time at 160° F. for various gellable treatment fluids comprising a t-butylacrylate/acrylamide base polymer, polyethyleneimine, and, optionally, a triethylenetetraamine gel-time modifier. As shown in FIG. 2, addition of 0.36 wt. % diethylenetriamine in inventive treatment fluid (6) decreased the gel-time to approximately 550 minutes, compared to approximately 750 minutes in control treatment fluid (2). A further increase in the diethylenetriamine concentration to 1.5 wt. % in inventive treatment fluid (8) decreased the gel-time to about 500 minutes. Likewise, as shown in FIG. 3, addition of 0.36 wt. % triethylenetetraamine in inventive treatment fluid (9) decreased the gel-time to approximately 500 minutes, compared to approximately 750 minutes in control treatment fluid (2). A further increase in the triethylenetetraamine concentration to 1.5 wt. % in inventive treatment fluid (11) decreased the gel-time to approximately 475 minutes. As shown in FIGS. 2 and 3, the two oligomeric polyamines produced comparable gel-time results to one another at like concentration. Further, upon comparison to FIG. 1, the gel-times produced by the amino alcohols and oligomeric polyamines were comparable to one another at like concentration. In summary, the foregoing example shows that the amount of crosslinkable polymer can be decreased through use of a gel-time modifier comprising at least one amino group.

Example 2

Gel-Times at 160° F. in Gellable Treatment Fluids Comprising a t-Butylacrylate/Acrylamide Base Polymer, Polyethyleneimine, and an Amino Alcohol Gel-Time Modifier (Reduction of Base Polymer Amounts)

Control gellable treatment fluids were prepared at the following compositions: (12) 350 gal/Mgal "HZ-10" and 30 gal/Mgal "HZ-20" in 2% aqueous KCl base fluid (same as control treatment fluid (2)), and (13) 175 gal/Mgal "HZ-10" and 30 gal/Mgal "HZ-20" in 2% aqueous KCl base fluid. Inventive treatment fluids were prepared at the following compositions: (14) 175 gal/Mgal "HZ-10," 30 gal/Mgal "HZ-20," and 0.36% by weight ethanolamine in 2% aqueous KCl base fluid, and (15) 175 gal/Mgal "HZ-10," 30 gal/Mgal "HZ-20," and 0.5% by volume triethanolamine in 2% aqueous KCl base fluid.

Figure 4:
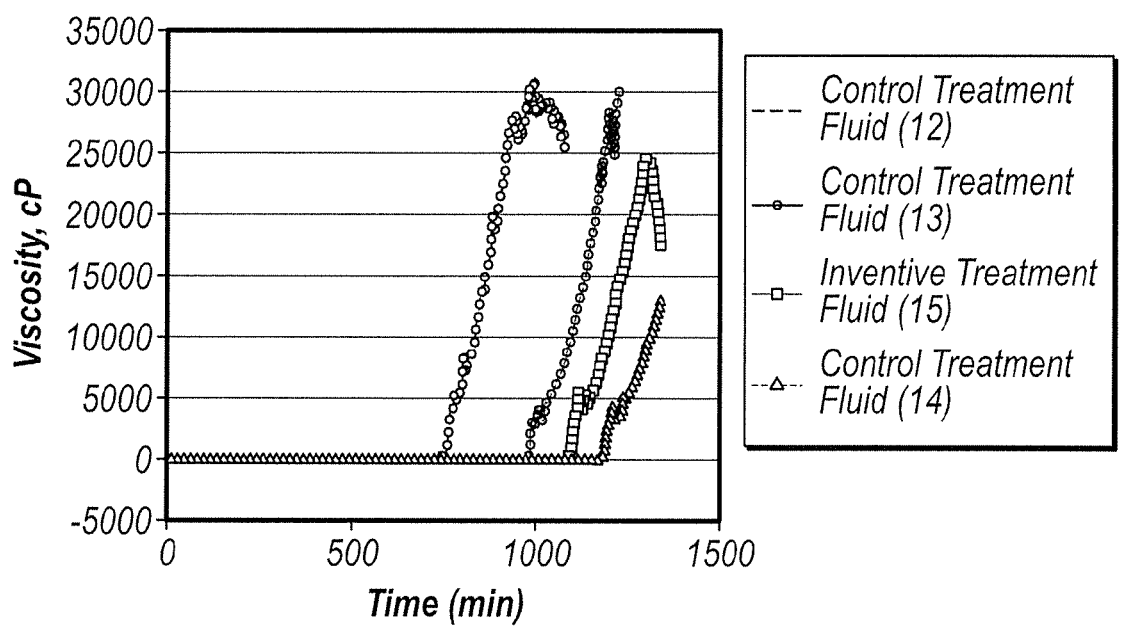
FIG. 4 shows an illustrative plot of viscosity as a function of time at 160° F. for various gellable treatment fluids comprising a t-butylacrylate/acrylamide base polymer, polyethyleneimine, and, optionally, an amino alcohol gel-time modifier.

The viscosities of the above treatment fluids were measured as a function of time in order to determine their gel-times. Viscosity measurements were made at 160° F. FIG. 4 shows an illustrative plot of viscosity as a function of time at 160° F. for various gellable treatment fluids comprising a t-butylacrylate/acrylamide base polymer, polyethyleneimine, and, optionally, an amino alcohol gel-time modifier. As shown in FIG. 4, control treatment fluid (12) had a gel-time of approximately 750 minutes. When the base polymer concentration was halved in control treatment fluid (13), the gel-time increased to approximately 1200 minutes. Addition of 0.36 wt. % ethanolamine in inventive treatment fluid (14) produced a gel-time of approximately 950 minutes. Addition of 0.5 vol. % triethanolamine in inventive treatment fluid (15) produced a gel-time of approximately 1100 minutes. Although the gel-times of the inventive treatment fluids did not reach those of the original control treatment fluid (12), the gel-times were still significantly reduced compared to that seen for control treatment fluid (13). In the case of inventive treatment fluids (14) and (15), the gel-times were comparable to those obtained when about 215-275 gal/Mgal of base polymer was used in the treatment fluid without the amino alcohol gel-time modifier being present. In summary, the foregoing example shows that the amount of base polymer can be decreased through use of an amino alcohol gel-time modifier.

Example 3

Gel-Times at 160° F. in Gellable Treatment Fluids Comprising a t-Butylacrylate/Acrylamide Base Polymer, Polyethyleneimine, and an Amino Alcohol Gel-Time Modifier (Reduction of Base Polymer and Crosslinkable Polymer Amounts)

A control gellable treatment fluid was prepared at the following composition: (16) 175 gal/Mgal "HZ-10" and 30 gal/Mgal "HZ-20" in 2% aqueous KCl base fluid (same as control treatment fluid (13)). Inventive treatment fluids were prepared at the following compositions: (17) 175 gal/Mgal "HZ-10," 30 gal/Mgal "HZ-20," and 0.36% by weight ethanolamine in 2% aqueous KCl base fluid, (18) 175 gal/Mgal "HZ-10," 30 gal/Mgal "HZ-20," and 0.75% by weight ethanolamine in 2% aqueous KCl base fluid, and (19) 175 gal/Mgal "HZ-10," 30 gal/Mgal "HZ-20," and 1.55% by weight ethanolamine in 2% aqueous KCl base fluid.

Figure 5:
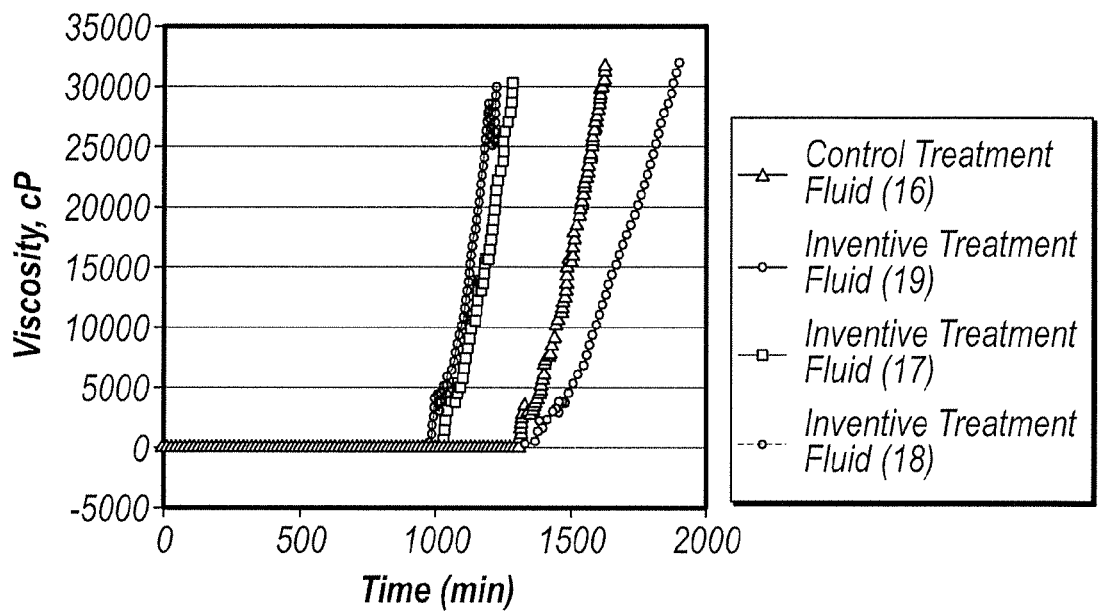
FIG. 5 shows an illustrative plot of viscosity as a function of time at 160° F. for various gellable treatment fluids comprising a t-butylacrylate/acrylamide base polymer, polyethyleneimine, and, optionally, an amino alcohol gel-time modifier.

The viscosities of the above treatment fluids were measured as a function of time in order to determine their gel-times. Viscosity measurements were made at 160° F. FIG. 5 shows an illustrative plot of viscosity as a function of time at 160° F. for various gellable treatment fluids comprising a t-butylacrylate/acrylamide base polymer, polyethyleneimine, and, optionally, an amino alcohol gel-time modifier. As shown in FIG. 5, control treatment fluid (16) had a gel-time of approximately 1300 minutes. When 0.36-0.75 wt. % ethanolamine was added in inventive treatment fluids (17) and (18), the gel-time decreased to approximately 1000 minutes. In contrast, when 1.5 wt. % ethanolamine was used in inventive treatment fluid (19), the gel-time actually increased to approximately 1400 minutes. Thus, in a treatment fluid comprising reduced concentrations of both base polymer and crosslinkable polymer, excessively high concentrations of ethanolamine actually served as a gel-time retarder, rather than as a gel-time promoter. However, at lower concentrations of ethanolamine, lower concentrations of the base polymer and the crosslinkable polymer can be used to obtain a comparable gel-time to that obtainable using higher concentrations of these components.

Example 4

Gel-Times at 250° F. in Gellable Treatment Fluids Comprising a t-Butylacrylate/Acrylamide Base Polymer, Polyethyleneimine, and an Amino Alcohol Gel-Time Modifier Control gellable treatment fluids were prepared at the following compositions: (20) 250 gal/Mgal "HZ-10" and 20 gal/Mgal "HZ-20" in 2% aqueous KCl base fluid, and (21) 167 gal/Mgal "HZ-10" and 20 gal/Mgal "HZ-20" in 2% aqueous KCl base fluid. An inventive treatment fluid was prepared at the following composition: (22) 167 gal/Mgal "HZ-10," 20 gal/Mgal "HZ-20," and 1% by volume ethanolamine in 2% aqueous KCl base fluid.

Figure 6:
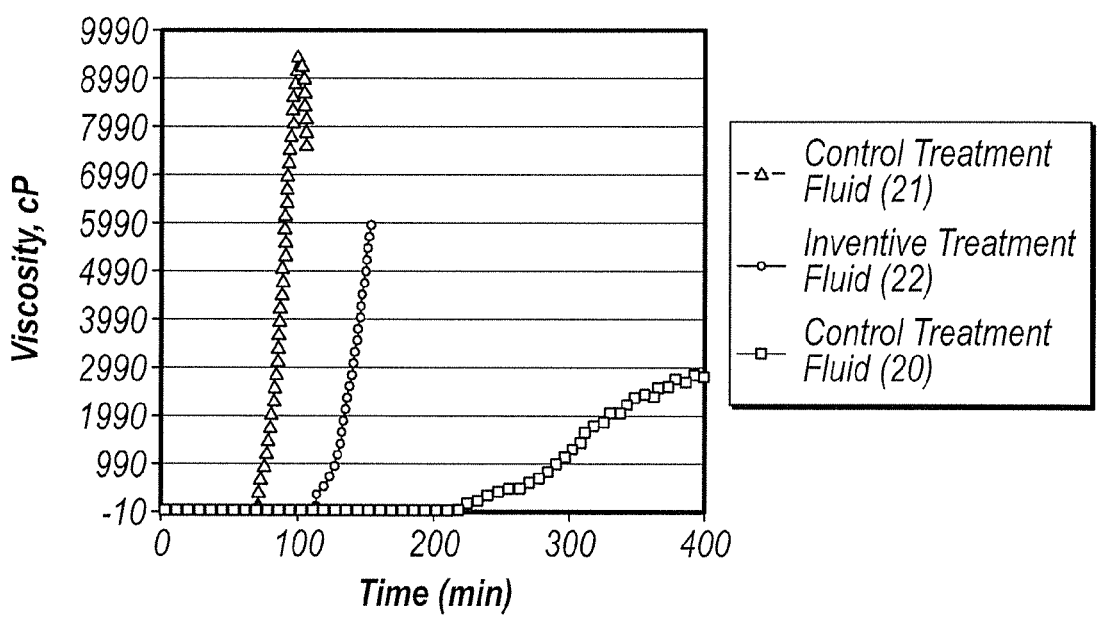
FIG. 6 shows an illustrative plot of viscosity as a function of time at 250° F. for various gellable treatment fluids comprising a t-butylacrylate/acrylamide base polymer, polyethyleneimine, and, optionally, an amino alcohol gel-time modifier.

The viscosities of the above treatment fluids were measured as a function of time in order to determine their gel-times. Viscosity measurements were made at 250° F. FIG. 6 shows an illustrative plot of viscosity as a function of time at 250° F. for various gellable treatment fluids comprising a t-butylacrylate/acrylamide base polymer, polyethyleneimine, and, optionally, an amino alcohol gel-time modifier. As shown in FIG. 6, control treatment fluid (20) had a gel-time of approximately 80 minutes. Decreasing the base polymer concentration in control treatment fluid (21) lengthened the gel-time to greater than 200 minutes. It is also notable the gel strength, as measured by the magnitude of the observed viscosity, was considerably lower in control treatment fluid (21). Inclusion of ethanolamine in inventive treatment fluid (22) lowered the gel-time to approximately 120 minutes. In addition, the gel strength of inventive treatment fluid (22) was considerably greater than that of control treatment fluid (21). In summary, the amino alcohol gel-time modifier again produced a reduced gel-time relative to a control treatment fluid lacking the gel-time modifier.

Example 5

Gel-Times at 160° F. in Gellable Treatment Fluids Comprising a t-Butylacrylate/Acrylamide Base Polymer, Polyethyleneimine, an Amino Alcohol Gel-Time Modifier, and a Quaternary Ammonium Salt Gel-Time Modifier Control gellable treatment fluids were prepared at the following compositions: (23) 350 gal/Mgal "HZ-10" and 30 gal/Mgal "HZ-20" in a 2% aqueous KCl base fluid (same as control treatment fluid (2)), and (24) 175 gal/Mgal "HZ-10" and 30 gal/Mgal "HZ-20" in a 2% aqueous KCl base fluid (same as control treatment fluid (13)). Inventive treatment fluids were prepared at the following compositions: (25) 175 gal/Mgal "HZ-10" and 30 gal/Mgal "HZ-20" in 2% aqueous tetramethylammonium chloride, and (26) 175 gal/Mgal "HZ-10" and 30 gal/Mgal "HZ-20" in 2% aqueous tetramethylammonium chloride also comprising 0.5% ethanolamine by weight. The source of tetramethylammonium chloride was "CLAY FIX II", which is available from Halliburton Energy Services of Duncan, Okla. It is to be noted in inventive treatment fluids (25) and (26), the tetramethylammonium chloride replaced the KCl as the salt in the base fluid.

Figure 7:
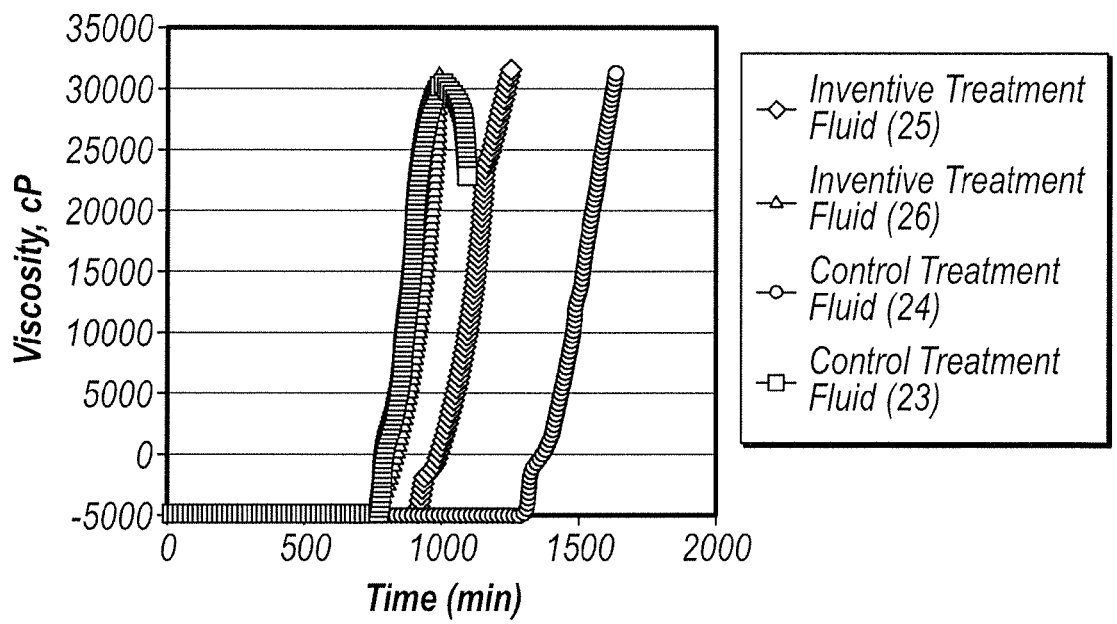
FIG. 7 shows an illustrative plot of viscosity at 160° F. as a function of time for various gellable treatment fluids comprising a t-butylacrylate/acrylamide base polymer, polyethyleneimine, tetramethylammonium chloride, and, optionally, ethanolamine.

The viscosities of the above treatment fluids were measured as a function of time in order to determine their gel-times. Viscosity measurements were made at 160° F. FIG. 7 shows an illustrative plot of viscosity at 160° F. as a function of time for various gellable treatment fluids comprising a t-butylacrylate/acrylamide base polymer, polyethyleneimine, tetramethylammonium chloride, and, optionally, ethanolamine. As shown in FIG. 7, control treatment fluid (23) had a gel-time of approximately 750 minutes. When the base polymer concentration was halved in control treatment fluid (24), the gel-time increased to approximately 1300 minutes. In contrast, when the 2% aqueous KCl base fluid of control treatment (24) was replaced with 2% aqueous tetramethylammonium chloride, the gel-time decreased to about 900 minutes in inventive treatment fluid (25). A further decrease in gel-time was realized in inventive treatment fluid (26) upon incorporation of 0.5 wt. % ethanolamine in the base fluid. In the case of inventive treatment (26), the gel-time was approximately 750 minutes, which is comparable to that of the original control treatment fluid (23). However, inventive treatment (26) achieved this gel-time with only half the original amount of base polymer.

Example 6

Gel-Times at 160° F. in Gellable Treatment Fluids Comprising a Partially Hydrolyzed Polyacrylamide Base Polymer, Polyethyleneimine and Various Gel-Time Modifiers A control gellable treatment fluid was prepared at the following composition: (27) 175 gal/Mgal "FDP-835™" and 30 gal/Mgal "HZ-20™" in a 2% aqueous KCl base fluid. Inventive treatment fluids were prepared at the following compositions: (28) 175 gal/Mgal "FDP-835™," 30 gal/Mgal "HZ-20 ™" and 0.38% by volume ethanolamine in 2% aqueous KCl base fluid; (29) 175 gal/Mgal "FDP-835™," 30 gal/Mgal "HZ-20 ™" and 0.5% by volume triethylenetetraamine in 2% aqueous KCl base fluid; and (30) 175 gal/Mgal "FDP-835™," 30 gal/Mgal "HZ-20 ™" and 0.70% by volume triethylenetetraamine in 2% aqueous KCl base fluid.

A control gellable treatment fluid was prepared at the following composition: (31) 175 gal/Mgal "FDP-835 ™" and 30 gal/Mgal "HZ-20 ™" in a 7% aqueous KCl base fluid. Inventive treatment fluids were prepared at the following compositions: (32) 175 gal/Mgal "FDP-835™," 30 gal/Mgal "HZ-20 ™" and 0.38% by volume ethanolamine in 7% aqueous KCl base fluid; (33) 175 gal/Mgal "FDP-835™," 30 gal/Mgal "HZ-20 ™" and 0.5% by volume triethylenetetraamine in 7% aqueous KCl base fluid; and (34) 175 gal/Mgal "FDP-835™," 30 gal/Mgal "HZ-20 ™" and 0.70% by volume triethylenetetraamine in 7% aqueous KCl base fluid. "FDP-835 ™" is a partially hydrolyzed polyacrylamide having a molecular weight of about 640,000 that is available from Halliburton Energy Services of Duncan, Okla. The source of tetramethylammonium chloride was "CLAY FIX II™."

Figure 8:
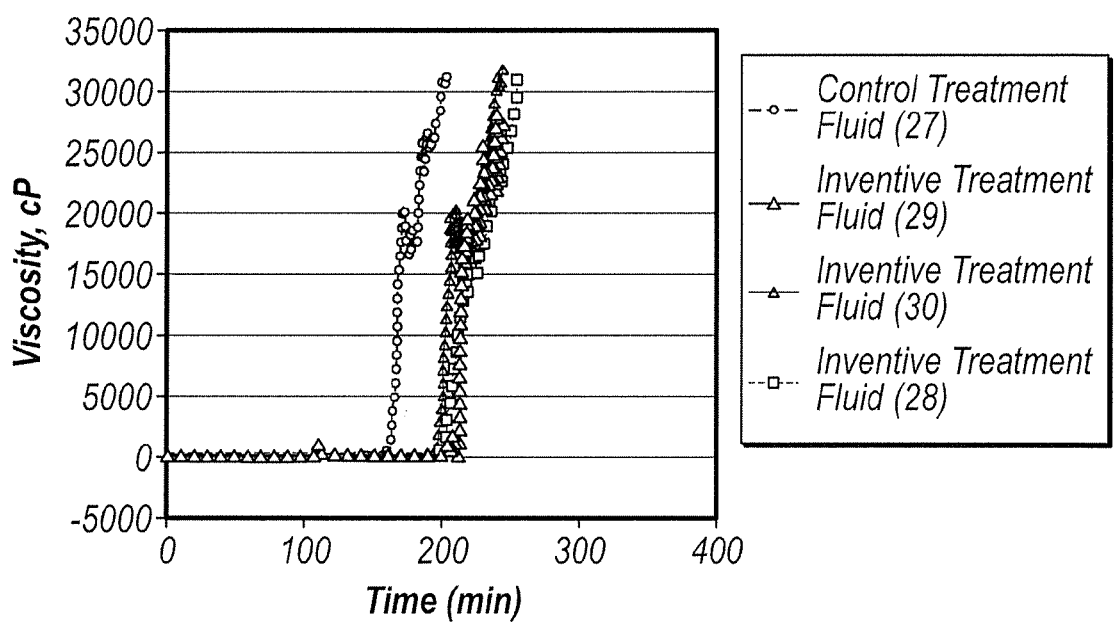
FIG. 8 shows an illustrative plot of viscosity at 160° F. as a function of time for various gellable treatment fluids comprising a partially hydrolyzed polyacrylamide, polyethyleneimine and various gel modifiers in a 2% KCl base fluid.
Figure 9:
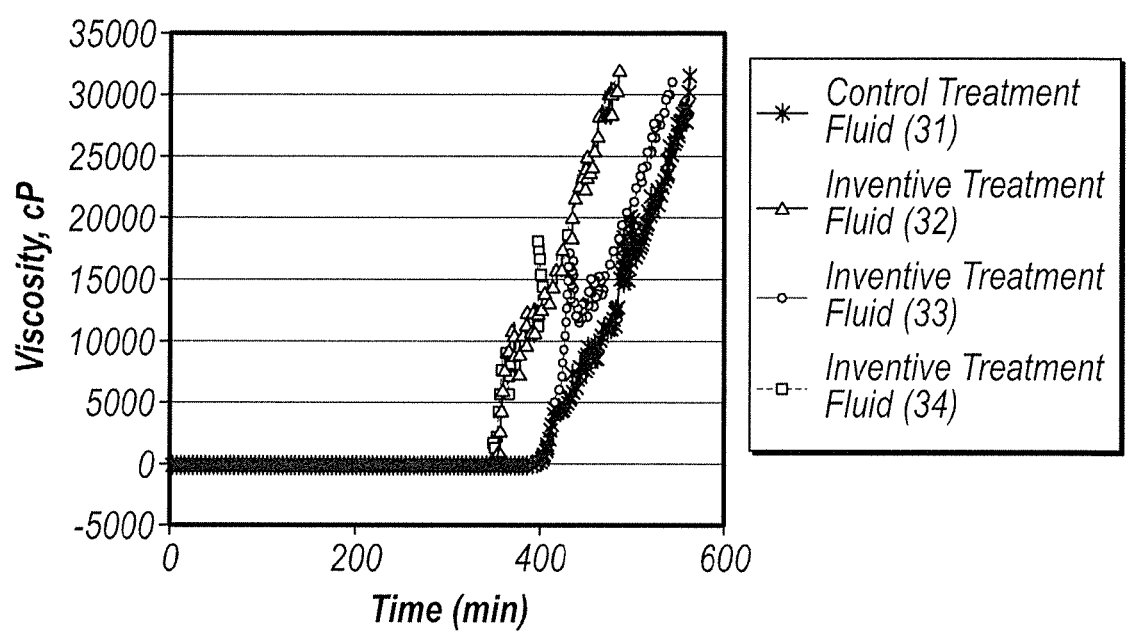
FIG. 9 shows an illustrative plot of viscosity at 160° F. as a function of time for various gellable treatment fluids comprising a partially hydrolyzed polyacrylamide, polyethyleneimine and various gel modifiers in a 7% KCl base fluid.

The viscosities of the above treatment fluids were measured as a function of time in order to determine their gel-times. Viscosity measurements were made at 160° F. FIG. 8 shows an illustrative plot of viscosity at 160° F. as a function of time for various gellable treatment fluids comprising a partially hydrolyzed polyacrylamide, polyethyleneimine and various gel modifiers in a 2% KCl base fluid. FIG. 9 shows an illustrative plot of viscosity at 160° F. as a function of time for various gellable treatment fluids comprising a partially hydrolyzed polyacrylamide, polyethyleneimine and various gel modifiers in a 7% KCl base fluid. The results showed that in a 2% KCl base fluid, the gel-time modifiers increased the gel-times, whereas in 7% KCl the same concentrations of the gel-time modifiers shortened the gel-times. It should be noted that the gel-times generally can increase significantly at higher salt concentrations, primarily due to the anionic character of the partially hydrolyzed polyacrylamide. It is believed that the foregoing results demonstrate that the gel-times of treatment fluids can be advantageously modified using gel-time modifiers in combination with appropriate inorganic salt concentrations.

Therefore, the present invention is well adapted to attain the ends and advantages mentioned as well as those that are inherent therein. The particular embodiments disclosed above are illustrative only, as the present invention may be modified and practiced in different but equivalent manners apparent to one of ordinary skill in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is the following:

1. A gellable treatment fluid comprising:
   an aqueous base fluid;
   a base polymer comprising an acrylamide monomer unit;
   an organic crosslinking agent comprising a crosslinkable polymer selected from the group consisting of polyethyleneimine, polyvinylamine, any derivative thereof, any salt thereof, and any combination thereof; and
   a gel-time modifier comprising at least one amino group, any salt thereof, any derivative thereof, or any combination thereof;
   wherein a concentration of the gel-time modifier in the gellable treatment fluid ranges between about 0.1% to about 2% by weight and a ratio of the base polymer to the organic crosslinking agent ranges between about 5:1 to about 50:1.

2. The gellable treatment fluid of claim 1, wherein the base polymer comprises a polymer selected from the group consisting of a partially hydrolyzed polyacrylamide, a copolymer of acrylamide and t-butyl acrylate, any derivative thereof, and any combination thereof.

3. The gellable treatment fluid of claim 1, wherein the gel-time modifier comprises at least one compound selected from the group consisting of amino alcohols, oligomeric polyamines, any salt thereof, any derivative thereof, and any combination thereof.

4. The gellable treatment fluid of claim 3, wherein the gel-time modifier comprises at least one amino alcohol selected from the group consisting of ethanolamine, diethanolamine, triethanolamine, propanolamine, any salt thereof, any derivative thereof, and any combination thereof.

5. The gellable treatment fluid of claim 3, wherein the gel-time modifier comprises at least one oligomeric polyamine selected from the group consisting of diethylene triamine, triethylene tetraamine, tetraethylene pentaamine, any salt thereof, any derivative thereof, and any combination thereof.

6. The gellable treatment fluid of claim 3, wherein the gel-time modifier comprises at least one oligomeric polyamine having a molecular weight of less than about 400.

7. The gellable treatment fluid of claim 1, wherein the gellable treatment fluid further comprises at least one additional gel-time modifier that comprises a quaternary ammonium salt.

8. The gellable treatment fluid of claim 1, wherein the base polymer comprises a copolymer of acrylamide and t-butyl acrylate, and the gel-time modifier comprises at least one amino alcohol selected from the group consisting of ethanolamine, diethanolamine, triethanolamine, propanolamine, and any combination thereof.

9. The gellable treatment fluid of claim 8, wherein the gellable treatment fluid further comprises at least one additional gel-time modifier that comprises a quaternary ammonium salt.

10. The gellable treatment fluid of claim 1, wherein the base polymer comprises a copolymer of acrylamide and t-butyl acrylate, and the gel-time modifier comprises at least one amino alcohol selected from the group consisting of diethylene triamine, triethylene tetraamine, tetraethylene pentaamine, and any combination thereof.

11. The gellable treatment fluid of claim 10, wherein the gellable treatment fluid further comprises at least one additional gel-time modifier that comprises a quaternary ammonium salt.

* * * * *